United States Patent
Chen et al.

(10) Patent No.: US 9,122,827 B2
(45) Date of Patent: *Sep. 1, 2015

(54) MEMS MODELING SYSTEM AND METHOD

(71) Applicant: Taiwan Semiconductor Manufacturing Company, Ltd., Hsin-Chu (TW)

(72) Inventors: Tung-Tsun Chen, Hsin-Chu (TW); Yung-Chow Peng, Hsin-Chu (TW); Jui-Cheng Huang, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,490

(22) Filed: Jun. 23, 2014

(65) Prior Publication Data

US 2014/0304667 A1   Oct. 9, 2014

Related U.S. Application Data

(63) Continuation of application No. 13/029,942, filed on Feb. 17, 2011, now Pat. No. 8,762,925.

(51) Int. Cl.
  *G06F 17/50*   (2006.01)
(52) U.S. Cl.
  CPC ........ *G06F 17/5068* (2013.01); *G06F 17/5022* (2013.01); *G06F 17/5081* (2013.01)
(58) Field of Classification Search
  None
  See application file for complete search history.

(56) References Cited

U.S. PATENT DOCUMENTS 6,116,766 A * 9/2000 Maseeh et al. .................. 700/97

OTHER PUBLICATIONS

Schmidt et al., "Optimization of MEMs fabrication process design by virtual experiemtns," Proc. of SPIE, vol. 6415, 2006, 8 pages.*
Coventor, Inc., "CoventorWare® for MEMS CAD Design, Multiphysics Modeling and Simulation," Rel. Date Mar. 2010, 50 pages.
Dumas, N. et al. "Evaluation of a fully electrical test and calibration method for MEMS capacitive accelerometers," 2008 IEEE 14th International Mixed-Signals, Sensors, and Systems Test Workshop, IEEE, Jun. 2008, 6 pages.
Fedder, Gary, K., "Issues in MEMS Macromodeling," Proceedings of the 2003 Workshop on Behavioral Modeling and Simulation, IEEE, Oct. 7-8, 2003, pp. 64-69.
Funk, Jörg et al., "SOLIDIS: A Tool for Microactuator Simulation in 3-D," Journal of Microelectromechanical Systems, vol. 6, Issue. 1, Mar. 1997, pp. 70-82.
Hahn, Kai et al., "Process management and design for MEMS and microelectronics technologies," 2004 Proceedings of SPIE, Microelectronics: Design, Technology, and Packaging, vol. 5274, Mar. 2004, pp. 322-330.

(Continued)

*Primary Examiner* — Leigh Garbowski
(74) *Attorney, Agent, or Firm* — Slater & Matsil, L.L.P.

(57) ABSTRACT

A system and method for modeling microelectromechanical devices is disclosed. An embodiment includes separating the microelectromechanical design into separate regions and modeling the separate regions separately. Parametric parameters or parametric equations may be utilized in the separate models. The separate models may be integrated into a MEMS device model. The MEMS device model may be tested and calibrated, and then may be used to model new designs for microelectromechanical devices.

20 Claims, 4 Drawing Sheets

(56) References Cited

OTHER PUBLICATIONS

Khalilyulin, Ruslan et al., "Modeling Approach for Full-System Design and Rapid Hardware Prototyping of Microelectromechanical Systems," 2010 IEEE Sensors Conference, Nov. 1-4, 2010, pp. 1405-1410.

Popp, Jens et al., "MEMS fabrication process management environment," Micromachining and Microfabrication Process Technology X, 2005 Proc. of SPIE, vol. 5715, Apr. 2005, pp. 148-158.

Schmidt, Thilo et al., "A Knowledge Based Approach for MEMS Fabrication Process Design Automation," 33rd International Electronics Manufacturing Technology Conference, 2008, pp. 1-6.

Vosskaemper, L.M., et al., "Calibration in a MEMS based measurement system or how to make a sensor-ASIC loop of high resolution work," 2008 2nd European Conference & Exhibition on Integration Issues of Miniaturized Systems—MOMS, MOEMS, ICS and Electronic Components (SSI), Volume, Apr. 9-10, 2008, 4 pages.

Wachutka, G. et al., "Predictive Simulation of Microdevices and Microsystems: The Basis of Virtual Prototyping," Macroelectronics, 2004, Proc. 24th International Conference on Microelectronics, vol. 1, May 16-19, 2004, pp. 71-78.

* cited by examiner

MEMS MODELING SYSTEM AND METHOD

This application is a continuation of U.S. patent application Ser. No. 13/029,942, filed on Feb. 17, 2011, entitled "MEMS Modeling System and Method," which application is hereby incorporated herein by reference.

TECHNICAL FIELD

Embodiments relate generally to a system and method for modeling devices and, more particularly, to a system and method for modeling microelectromechanical devices.

BACKGROUND

Generally, when a behavior model for microelectromechanical devices is developed, developers may take one of two approaches: a "top-down" approach or a "bottom-up" approach. In a "top-down" approach the developer begins with desired features of the device and then attempts to determine a geometry and shape of the device that will provide the desired features, resulting in an eventual physical device that may be tested. However, in this approach, if the result produces a physical microelectromechanical device that is outside of the desired specifications (and, therefore, is not suitable), the entire process, from the design to the physical device, must be redone, losing any incremental progress that may have been achieved.

Conversely, in a "bottom-up" approach, a physical three-dimensional structure of the desired microelectromechanical device is built first. Once built, the microelectromechanical structure may undergo a finite-element method or a boundary-element method analysis, which may then be transformed into a behavioral model of the microelectromechanical structure. From this behavior model further design may be performed for new microelectromechanical devices. However, similar to the "top-down" approach described above, if a microelectromechanical device is designed from the behavior model and is outside of the desired specifications, the entire process must be repeated, including the original manufacturing of the three-dimensional structure, the finite-element method, the transformation into a behavior model, and the eventual redesign of the desired device. As such, neither of these approaches allows for an improvement of the behavioral model without again undertaking the entire design process, thereby wasting time and resources.

BRIEF DESCRIPTION OF THE DRAWINGS

For a more complete understanding of the embodiments, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the embodiments.

Embodiments will be described with respect to a specific context, namely a system and method for modeling microelectromechanical devices. Other embodiments may also be applied, however, to other modeling systems.

Figure 1:
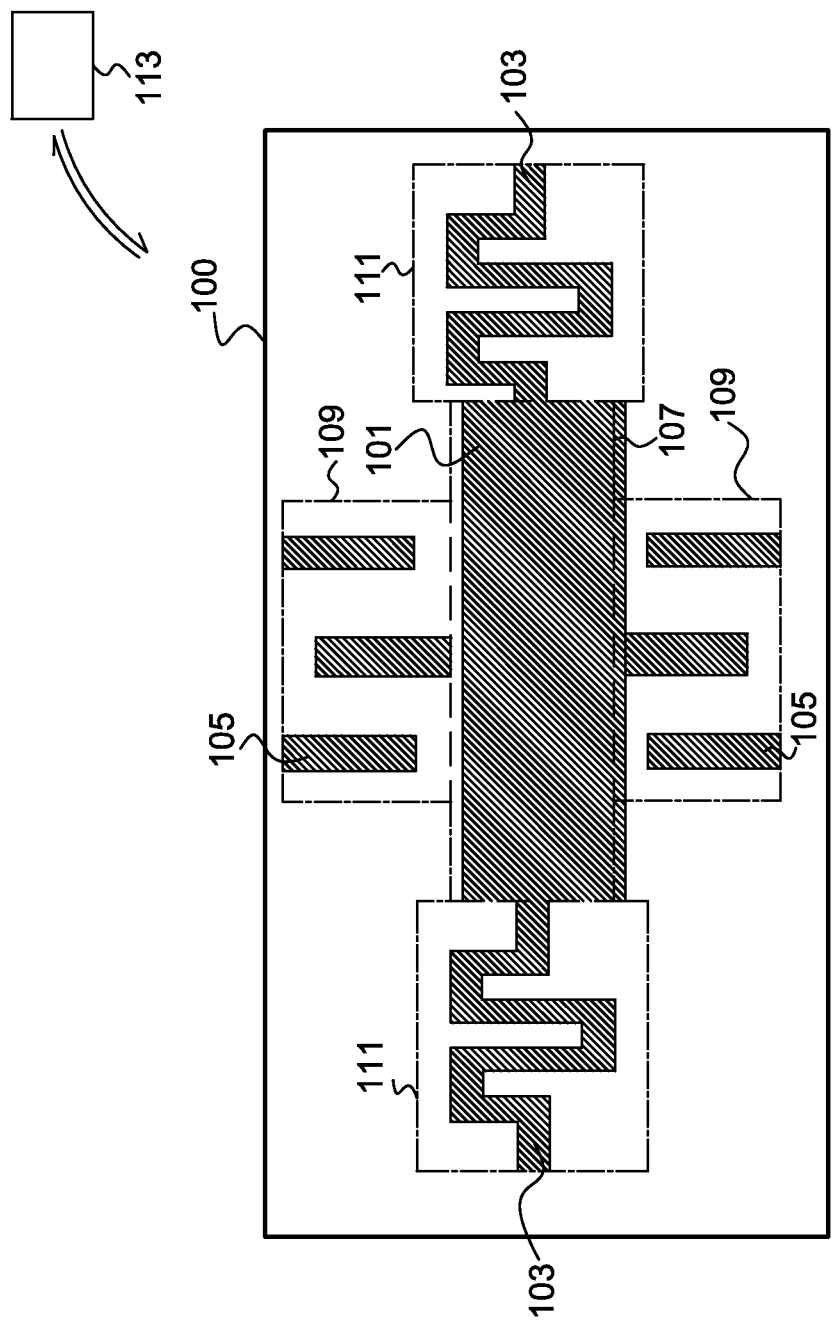
FIG. 1 illustrates a first dummy microelectromechanical (MEMS) device in accordance with an embodiment.

With reference to FIG. 1, there is shown a first dummy microelectromechanical (MEMS) design 100. The first dummy MEMS design 100 may be, for example, a dummy MEMS accelerometer that comprises a moveable mass 101, springs 103, and electrodes 105. The dummy MEMS accelerometer may be designed so that, if it were ever to be manufactured and used in operation, the moveable mass 101 would move in relation to the overall motion of the accelerometer, thereby causing the capacitance of the electrodes 105 to change and allowing a processor (not shown in FIG. 1) to determine the acceleration from the movement of the moveable mass 101. The springs 103 would attach the moveable mass 101 to the overall structure while still allowing the moveable mass 101 to move.

The first dummy MEMS design 100 is referred to as a "dummy" device because it is not the final product that will be manufactured for commerce. Rather, it is a design which is intended to be used to help generate a final design for manufacture. However, as one of ordinary skill in the art will recognize, this description of a "dummy" device is not meant to be limiting, and any other suitable design may also be utilized. For example, a final product design that was previously built may also be used if available, and other types of MEMS device designs, such as gyroscopes, resonators and micro-mirrors, combinations of these, or the like, may alternatively be utilized. Any design, no matter its origin, may alternatively be used as the first dummy MEMS design 100.

The first dummy MEMS design 100 may be stored, e.g., within a mask database (represented in FIG. 1 by dashed box 113). The mask database 113 may be a two dimensional mask database that stores a series of photolithographic masks that may be used in the manufacture of MEMS devices, such as the MEMS accelerometer. However, the described mask database is not intended to limit how the first dummy MEMS design 100 may be stored, as any suitable storage medium, such as a three dimensional mask database or other design storage, may alternatively be utilized.

The first dummy MEMS design 100 may, if desired, be manufactured using, e.g., a series of two dimensional masks from a mask database 113 along with a suitable manufacturing process to form a structure from the first dummy MEMS design 100. For example, a first mask may be utilized to illuminate a first photoresist, which may then be utilized to protect or expose desired regions for further processing, such as etching. By using a series of these masks in sequence during a process, a desired shape or structure may be formed until the overall desired first dummy MEMS design 100 is formed as a physical structure.

FIG. 1 also illustrates that the first dummy MEMS design 100 within, e.g., the mask database 113 may be separated into separate dummy regions or dummy modules, such as a mass module 107, an electrode module 109, and a spring module 111. As their names suggest, the mass module 107 may include that portion of the first dummy MEMS design 100 that includes the moveable mass 101, the spring module 111 may include that portion of the first dummy MEMS design 100 that includes the springs 103 of the first dummy MEMS design 100, and the electrode module 109 may includes that portion of the first dummy MEMS design 100 that contains the electrodes 105 of the first dummy MEMS design 100.

The separate dummy regions may be stored as separate regions, or dummy layers, of a two-dimensional mask within the two dimensional mask database, and each of the separate dummy regions may be maintained within the two dimensional mask database until the separate dummy regions are joined into a single mask. For example, when the first dummy MEMS design 100 is desired to be finished and/or manufactured, the separate dummy regions, such as the mass module 107, the electrode module 109, and the spring module 111, may be joined together through, e.g., an "AND" process in order to form a single mask for the first dummy MEMS design 100.

After the first dummy MEMS design 100 has been separated into the separate dummy regions, each of the separate dummy regions may be modeled separately from each other. For example, the electrode module 109 may be modeled separately from the mass module 107, which may be modeled separately from the spring module 111. As an example only, the parameters of the electrode module 109, such as its sensor capacitance or its electrostatic forces, may be parametrically modeled based upon the geometry and shape of the electrodes 105 in the first dummy MEMS design 100. For instance, the parameters of the electrodes 105 in the first dummy MEMS design 100 may be used to satisfy an equation, such as a parametric equation, related to the electrostatic force of the electrodes, such as Equation 1:

$$F_e = \frac{\epsilon_o LH}{2D^2}(V_m - V_s)^2 \qquad \text{Eq. 1}$$

Where: $F_e$=Electrostatic Force
$\epsilon_o$=Permittivity of Free Space
L=Length of the Electrodes
H=Height of the Electrodes
D=Distance between the Electrodes
$V_m$=Main Electrode Voltage
$V_s$=Secondary Electrode Voltage In this parametric equation the length (L) of the electrodes 105, the height (H) of the electrodes 105, and the distance (D) of the electrodes 105 may be parametric parameters that may be utilized in the parametric modeling of future designs.

Such parametric equations as the one illustrated above with respect to Equation 1 allow certain variables, known as parametric variables, to represent a much more complicated relationship. In the example of Equation 1 above, the electrostatic force may be represented by Equation 1 using the parametric variables L, H and D, although many more variables may be used to calculate the electrostatic force. However, by utilizing the parametric equation for the electrostatic force, a change in one or more of the parametric variables represents a change that would occur in the relation between that variable and the resulting change in the electrostatic force. As such, complicated equations may be simplified for purposes of modeling.

However, as one of ordinary skill in the art will recognize, the parametric equations presented are not the only equations that may be utilized in order to obtain models for the mass module 107, the spring module 111, or the electrode module 109. Other equations, such as non-parametric equations or parametric equations with different parametric parameters than those listed above in Equation 1, may alternatively be utilized. Any suitable equation or combination of equations may alternatively be utilized to model the mass module 107, the spring module 111, or the electrode module 109, and all such equations are fully intended to be included within the scope of the embodiments.

Additionally, the parameters of the electrodes 105 in the first dummy MEMS design 100 may also be used to satisfy an equation related to the sensor capacitance of the electrodes 105, such as the parametric equation illustrated in Equation 2:

$$C_s = \frac{\epsilon_o LH}{2D} \qquad \text{Eq. 2}$$

Where: $C_s$=Sensor Capacitance
$\epsilon_o$=Permittivity of Free Space
L=Length of the Electrodes
H=Height of the Electrodes
D=Distance between the Electrodes Similar to Equation 1 discussed above, in Equation 2 the length (L) of the electrodes 105, the height (H) of the electrodes 105, and the distance (D) of the electrodes 105 may be parametric parameters.

Optionally, the initial parametric parameters of Equation 1 and Equation 2 may be constrained using, e.g., the design rules for the manufacturing processes being utilized. For example, if a 90 nm process node design is being utilized for the manufacturing of the eventual product MEMS device, 90 nm process node design rules may be utilized to further constrain the parameters for the equations, such as constraining the distance between electrodes "D" to be 1 μm<D<2 μm.

After the equations illustrated by Equation 1 and Equation 2 have been created for the electrode module 109, similar equations may be created for the mass module 107 and the spring module 111. As an example only, the mass module 107 may be modeled using an equation similar to Equation 3:

$$F_{mass\_force} = MA \qquad \text{Eq. 3}$$

Where: $F_{mass\_force}$=Force on the Mass Module
M=Mass of the Mass Module
A=Acceleration of the Mass Module Similarly, the spring module 111 may be modeled using an equation similar to Equation 4:

$$F_{spring\_force} = KX \qquad \text{Eq. 4}$$

Where: $F_{spring\_force}$=Force of the Springs
K=Spring Constant of the Spring
X=Displacement of the Spring As one of ordinary skill in the art will recognize, the specific equations illustrated above are merely illustrative of embodiments, and are not meant to limit the embodiments in any manner. Any equations that may be suitable to model specific regions of microelectromechanical devices, such as equations for other geometries, shapes, or even other devices such like gyroscopes and resonators, may be alternatively utilized. All such equations are fully intended to be included within the scope of the present embodiments.

Figure 2A:
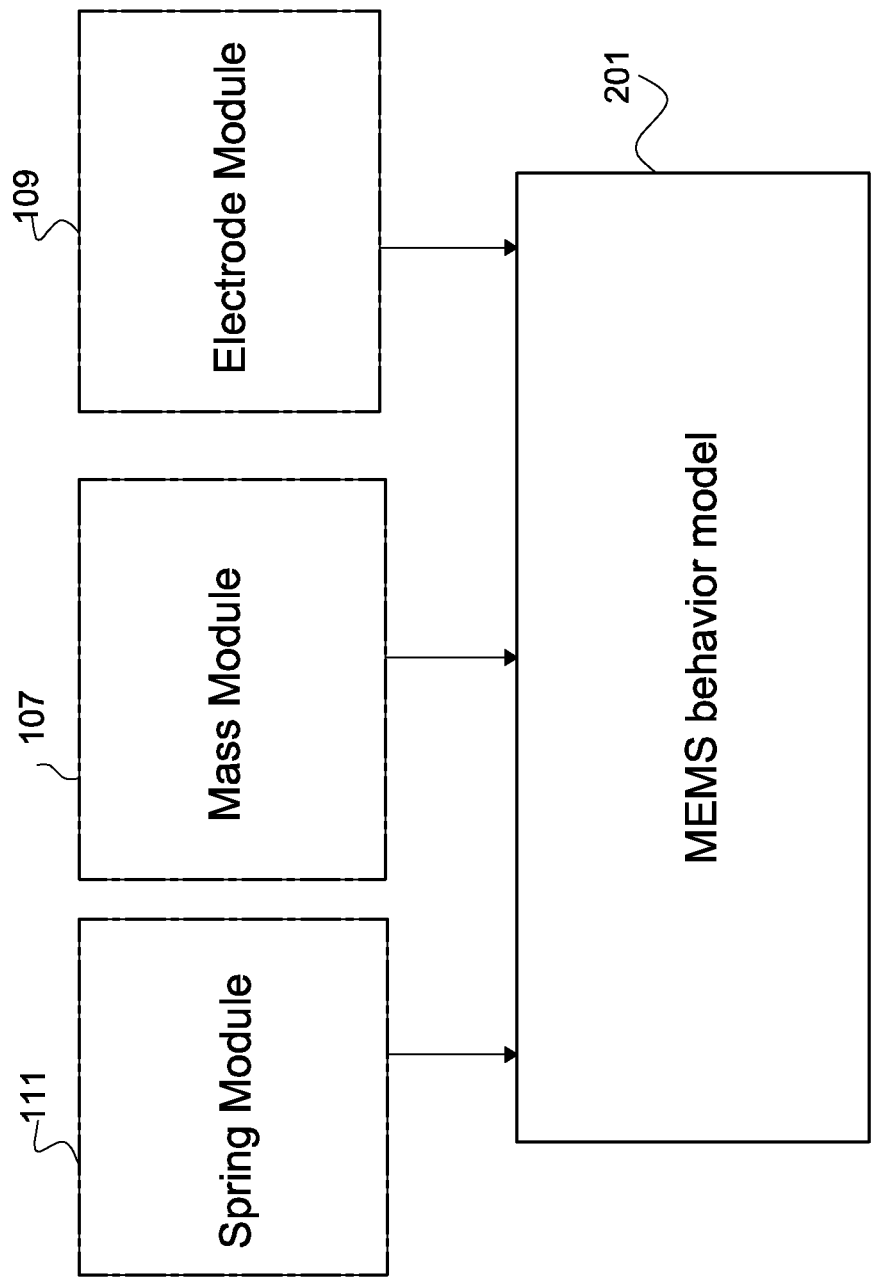
FIGS. 2A-2B illustrates the formation of a MEMS behavior model in accordance with an embodiment.

FIG. 2A illustrates the combining of each of the separate dummy regions into a MEMS behavior model 201. In an embodiment, once the spring module 111, the mass module 107, and the electrode module 109 have been modeled (using, e.g., Equations 1-4 described above), these models are integrated into the MEMS behavior model 201 so that these equations can be utilized to design other MEMS devices, such as final products for eventual mass production.

Figure 2B:
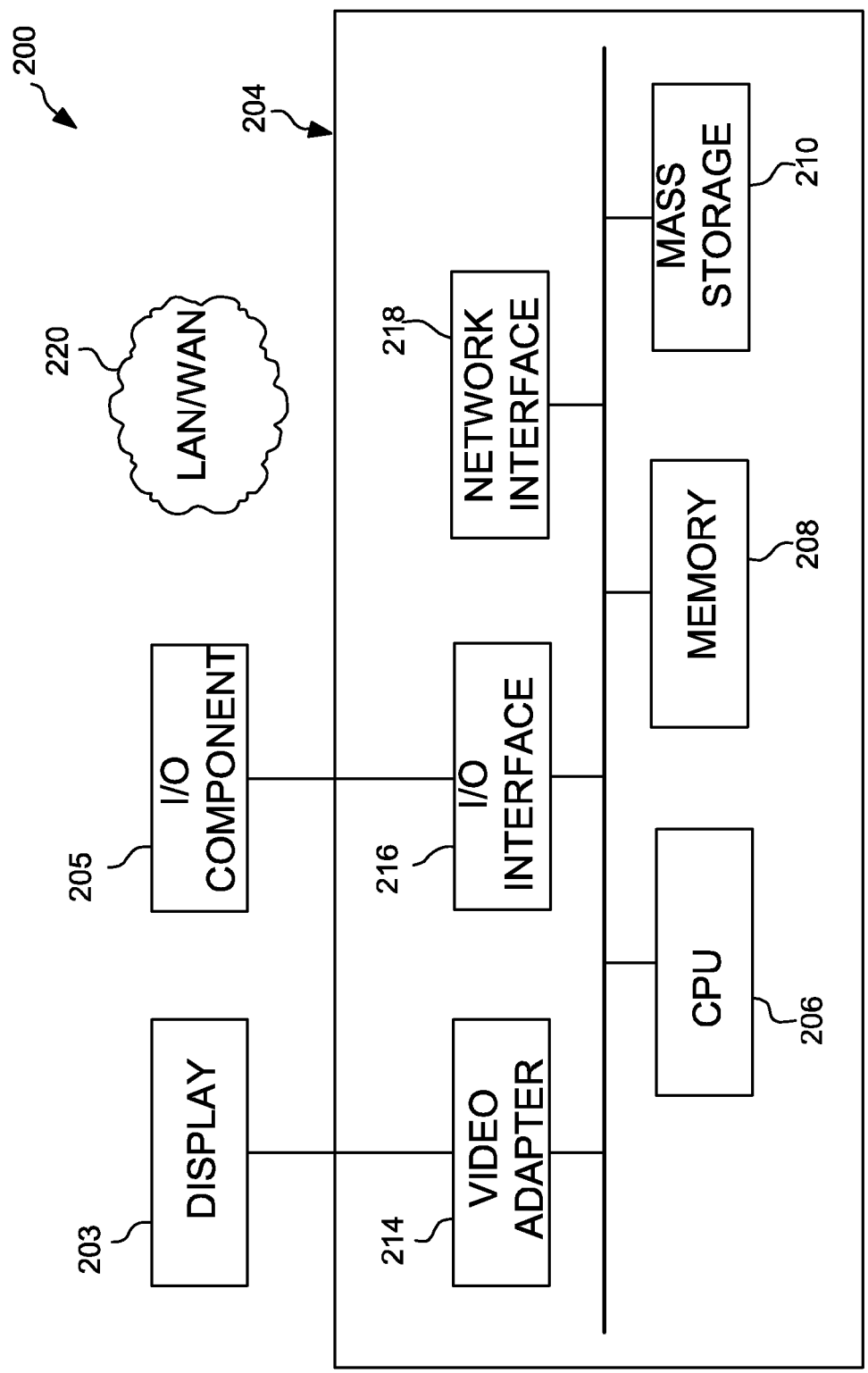

FIG. 2B illustrates a block diagram of a processing system 200 that may be used to implement the MEMS behavior model 201. The processing system 200 is a general purpose computer platform and may be used to implement any or all of the processes discussed herein. The processing system 200 may comprise a processing unit 204, such as a desktop computer, a workstation, a laptop computer, or a dedicated unit customized for a particular application. The processing system 200 may be equipped with a display 203 and one or more input/output devices 205, such as a mouse, a keyboard, or printer. The processing unit 204 may include a central processing unit (CPU) 206, memory 208, a mass storage device 210, a video adapter 214, and an I/O interface 216 connected to a bus 212.

The bus 212 may be one or more of any type of several bus architectures including a memory bus or memory controller, a peripheral bus, or video bus. The CPU 206 may comprise any type of electronic data processor, and the memory 208 may comprise any type of system memory, such as static random access memory (SRAM), dynamic random access memory (DRAM), or read-only memory (ROM).

The mass storage device 210 may comprise any type of storage device configured to store data, programs, and other information and to make the data, programs, and other information accessible via the bus 212. The mass storage device 210 may comprise, for example, one or more of a hard disk drive, a magnetic disk drive, or an optical disk drive.

The video adapter 214 and the I/O interface 216 provide interfaces to couple external input and output devices to the processing unit 204. As illustrated in FIG. 2B, examples of input and output devices include the display 203 coupled to the video adapter 214 and the I/O device 205, such as a mouse, keyboard, printer, and the like, coupled to the I/O interface 216. Other devices may be coupled to the processing unit 204, and additional or fewer interface cards may be utilized. For example, a serial interface card (not shown) may be used to provide a serial interface for a printer. The processing unit 204 also may include a network interface 218 that may be a wired link to a local area network (LAN) or a wide area network (WAN) 220 and/or a wireless link.

It should be noted that the processing system 200 may include other components. For example, the processing system 200 may include power supplies, cables, a motherboard, removable storage media, cases, and the like. These other components, although not shown, are considered part of the processing system 200.

Embodiments of the MEMS behavior model 201 (shown in FIG. 2A) are implemented on the processing system 200, such as by program code executed by the CPU 206. For instance, the MEMS behavior model 201 may be input into the processing system 200 by inputting the models (e.g., Equations 1-4 above) for each of the dummy regions (e.g., the spring module 111, the mass module 107, and the electrode module 109) using, e.g., I/O component 205. Additionally, the MEMS behavior model 201 may be stored in the mass storage device 210. When desired, a user (not shown) may use the CPU 206 and the memory 208 to implement the MEMS behavior model 201.

Figure 3:
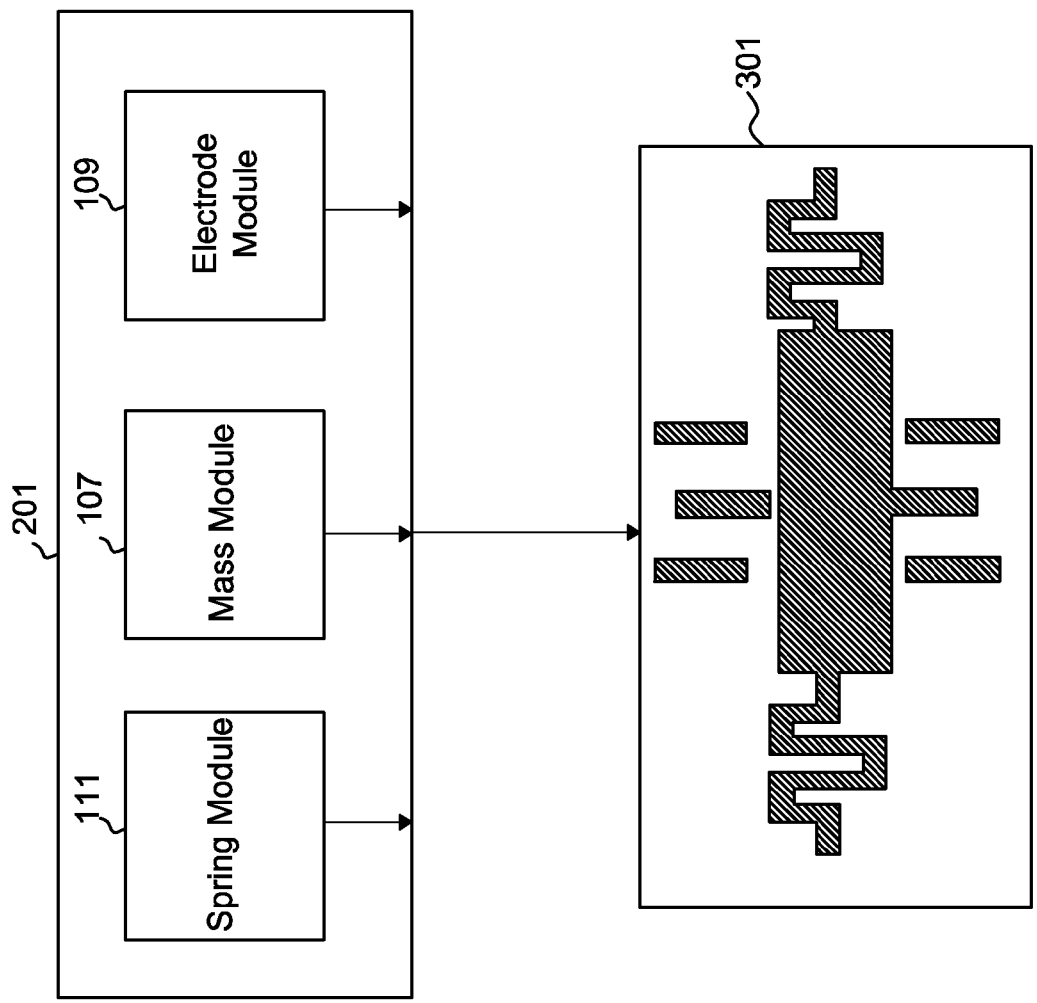
FIG. 3 illustrates a usage of the MEMS behavior model in accordance with an embodiment.

FIG. 3 illustrates that once the MEMS behavior model 201 has been populated and input in to the processing system 200, it may be calibrated using a calibration design 301. In an embodiment the calibration design 301 may be generated by a user (not shown) that utilizes the MEMS behavior model 201 (with the integrated models from the spring module 111, the mass module 107, and the electrode module 109) to formulate the calibration design 301. Such design work may include taking desired effects, such as the sensor capacitance and back calculating the necessary physical design that would meet such specifications without requiring a full physical production model to be formed. The calibration design 301 may be in the shape of a desired device such as, e.g., an accelerometer.

Once designed using the MEMS behavior model 201, the calibration design 301 may be tested in order to ensure that it meet all of the desired specifications for the calibration design 301. In an embodiment the calibration design 301 may be tested while still in the design stage by testing the calibration design 301 with other models. For example, a method of silicon correlation, in which a spring constant ($K_0$) and mass ($M_0$) are pre-determined, may be used. These two parameters may be used to determine the resonant frequency ($f_0$) of the MEMS device by Equation 5:

$$f_0 = \frac{1}{2\pi}\sqrt{\frac{K_0}{M_0}} \qquad \text{Eq. 5}$$

Such a resonant frequency can be measured by by spectrum analysis and a new $f_0'$ can be obtained to correlate the spring constant and the mass to be $K_0'$ and $M_0'$, thereby developing a new calibrated equation:

$$f_0' = \frac{1}{2\pi}\sqrt{\frac{K_0'}{M_0'}} \qquad \text{Eq. 6}$$

From this, the calibration design 301 is electronically modeled prior to manufacturing, may be utilized in order to test the calibration design 301 to ensure that the product MEMS device 301 remains within all of the desired specifications. Any other suitable method of testing the calibration design 301 while the calibration design 301 is in the design stage, such as a co-simulation of the calibration design 301 with an application-specific integrated circuit (ASIC) model, a transient simulation to check the nonlinearity specification, or a noise simulation to check the signal to noise ratio (SNR), combinations of these, or the like, may also alternatively be utilized to assess the performance of the MEMS behavior model 201 with the integrated models from the spring module 111, the mass module 107, and the electrode module 109.

However, as one of ordinary skill in the art will recognize, testing the calibration design 301 while only in a design stage is not the only method suitable for calibrating the MEMS behavior model 201. In an alternative embodiment, the calibration design 301 may be tested by using the calibration design 301 to manufacture a physical product from the calibration design 301. Once manufactured into a physical product, the calibration design 301 may be physically tested to determine if it meets the desired specifications. As an example only, a three dimensional model buildup and mechanical analysis, such as finite element (FEM), may be performed on the calibration design 301 in order to determine if the calibration design 301 is within the desired specifications. Alternatively, any other suitable physical test and simulation, such as boundary element (BEM), other numerical and analytical solutions, combinations of these, or the like, may alternatively be utilized.

If the calibration design 301 passes all of the tests (whether they be modeling tests, physical tests, or some combination of these) and remains within the desired specifications, the MEMS behavior model 201 may be ready for use in order to design further MEMS devices. However, if the calibration design 301 fails to meet any of the specifications, then the MEMS behavior model 201 may be adjusted and calibrated in order to ensure that the MEMS behavior model 201 produces a product that is within the desired specifications. For example, a user may adjust one or more of the parametric parameters in the models of the mass module 107, the spring module 111, and/or the electrode module 109 may be adjusted in order to adjust the behavior models. Such an adjustment of the parametric parameters within the models allows the MEMS behavior model 201 to be updated without also requiring the manufacturing of a new first dummy MEMS design 100 (shown in FIG. 1 above).

For example, if the calibration design 301 is discovered to be out of specification, a designer may go back to the parametric equations for the electrode module 109 and adjust one of the parametric parameters (e.g., the length of the electrodes (L), the height of the electrodes (H), or the distance of the electrodes (D) in Equation 1 above, or even change the number of electrodes) in order to tune the parametric equations of the model for the electrode module 109. The decision as to which of the parameters may be tuned may be based on engineering knowledge, experience, trial-and-error, physical trend, fabrication capability, combinations of these, or the like.

By adjusting one or more of the parametric parameters in one or more of the models utilized for the mass module 107, the spring module 111, and/or the electrode module 109, the MEMS behavior model 201 may be updated and corrected without having to start the process completely over and resort to a brand new manufactured dummy MEMS device 100. By skipping this manufacturing step, time and effort may be reduced, thereby streamlining the time of design and making the overall design effort more efficient.

Once the MEMS behavior model 201 has been populated and calibrated (as discussed above with respect to FIG. 2 and FIG. 3), the MEMS behavior model 201 is ready to be used by a designer. For example, a designer may use the MEMS behavior model 201 to produce new designs for MEMS devices that meet the designer's desired criteria. Once a final design has been achieved using the MEMS behavior model 201, the final design may be implemented in a manufacturing process to manufacture MEMS devices that also meet the desired criteria.

In accordance with an embodiment, a method for modeling microelectromechanical devices comprising separating a MEMS design into a plurality of regions, at least one of the plurality of regions being in a separate dummy layer than another one of the plurality of regions, and developing a model for each of the plurality of regions is provided. The model for each of the plurality of regions is entered into a MEMS model.

In accordance with another embodiment, a method for modeling microelectromechanical devices comprising partitioning a three-dimensional MEMS design into a first region and a second region and developing a first model for the first region and a second model for the second region, the first model being different from the second model is provided. The first model and the second model are integrated into a MEMS device model.

In accordance with yet another embodiment, a computer program product for modeling microelectromechanical devices is provided. The computer program product has a non-transitory computer readable medium with a computer program embodied thereon, the computer program comprising computer program code for receiving a first model and a second model, the first model comprising a first region model of a first region of a microelectromechanical device and the second model comprising a second region model of a second region of the microelectromechanical device. The computer program also comprises computer program code for deriving a MEMS model from the first model and the second model.

Although the embodiments and their advantages have been described in detail, it should be understood that various changes, substitutions, and alterations can be made herein without departing from the spirit and scope of the embodiments as defined by the appended claims. For example, models that do not utilize parametric parameters may also be utilized. Additionally, the MEMS behavior model 201 may be calibrated using either a detailed design that is either representative or else physical.

Moreover, the scope of the present application is not intended to be limited to the particular embodiments of the process, machine, manufacture, composition of matter, means, methods, and steps described in the specification. As one of ordinary skill in the art will readily appreciate from the disclosure of the embodiments, processes, machines, manufacture, compositions of matter, means, methods, or steps, presently existing or later to be developed, that perform substantially the same function or achieve substantially the same result as the corresponding embodiments described herein may be utilized according to the embodiments. Accordingly, the appended claims are intended to include within their scope such processes, machines, manufacture, compositions of matter, means, methods, or steps.

What is claimed is:

1. A microelectromechanical device modeling system comprising:
    a two-dimensional mask database configured to store a first model and a second model, the first model comprising a first region model of a first region of a microelectromechanical device and the second model comprising a second region model of a second region of the microelectromechanical device, the first model and the second model modeling separate structures of the microelectromechanical device; and
    a processor configured to derive a MEMS model from the first model and the second model.

2. The microelectromechanical device modeling system of claim 1, wherein the first model comprises a parametric model.

3. The microelectromechanical device modeling system of claim 1, wherein the first model comprises at least one parametric parameter.

4. The microelectromechanical device modeling system of claim 1, wherein the processor is further configured to calibrate the MEMS model with a calibration design.

5. The microelectromechanical device modeling system of claim 1, wherein the MEMS model is a model of an accelerometer.

6. The microelectromechanical device modeling system of claim 1, wherein the first model is a spring model and the second model is a mass module.

7. A modeling system comprising:
    a database, wherein the database is configured to store a first two-dimensional mask model and a second two-dimensional mask model, wherein the first two-dimensional mask model comprises a first structural model of a microelectromechanical device, wherein the second two-dimensional mask model comprises a second structural model of the microelectromechanical device, wherein the first structural model is different from the second structural model; and
    a processor communicably coupled to the database, wherein the processor is configured to generate a MEMS model at least in part from the first structural model and the second structural model.

8. The modeling system of claim 7, wherein the database is further configured to store a third two-dimensional mask model, wherein the third two-dimensional mask model comprises a third structural model different from the first structural model and the second structural model.

9. The modeling system of claim 8, wherein the processor is further configured to generate the MEMS model at least in part from the third structural model.

10. The modeling system of claim 9, wherein the MEMS model is a model of an accelerometer, the first structural model is a model of a spring module, the second structural model is a model of a mass module, and the third structural model is a model of an electrode module.

11. The modeling system of claim 10, wherein the electrode module comprises electrodes and the third structural model comprises the following equation:

$$F_e = \frac{\epsilon_o LH}{2D^2}(V_m - V_s)^2$$

where $F_e$ is an electrostatic force, $\epsilon_o$ is a permittivity of free space, L is a length of the electrodes, H is a height of the electrodes, D is a distance between the electrodes, $V_m$ is a main electrode voltage, and $V_s$ is a secondary electrode voltage.

12. The modeling system of claim 11, wherein the second structural model comprises the following equation:

$$F_{mass\_force} = MA$$

where $F_{mass\_force}$ is a force on the mass module, M is a mass of the mass module, and A is an acceleration of the mass module.

13. The modeling system of claim 12, wherein the first structural model comprises the following equation:

$$F_{spring\_force} = KX$$

where $F_{spring\_force}$ is a force of the springs, K is a spring constant of the spring, and X is a displacement of the spring.

14. A microelectromechanical modeling system comprising:
- a two-dimensional mask database for storing an electrode model and a mass model, wherein the electrode model and the mass model represent different sections of a microelectromechanical accelerometer; and
- a processor communicably coupled to the two-dimensional mask database, wherein the processor is configured to receive the electrode model and the mass model from the two-dimensional mask database and generate a MEMS accelerometer model from the electrode model and the mass model.

15. The microelectromechanical modeling system of claim 14, wherein the two-dimensional mask database further stores a spring model, wherein the spring model represents a different section of the microelectromechanical accelerometer than the electrode model and the mass model.

16. The microelectromechanical modeling system of claim 15, wherein the processor is further configured to receive the spring model and generate the MEMS accelerometer model from the electrode model, the mass model, and the spring model.

17. The modeling system of claim 15, wherein the electrode model comprises the following equation:

$$C_s = \frac{\epsilon_o LH}{2D}$$

where $C_s$ is a sensor capacitance, $\epsilon_o$ is a permittivity of free space, L is a length of the electrodes, H is a height of the electrodes, and D is a distance between the electrodes.

18. The modeling system of claim 17, wherein the mass model comprises the following equation:

$$F_{mass\_force} = MA$$

where $F_{mass\_force}$ is a force on the mass module, M is a mass of the mass module, and A is an acceleration of the mass module.

19. The modeling system of claim 18, wherein the spring model comprises the following equation:

$$F_{spring\_force} = KX$$

where $F_{spring\_force}$ is a force of the springs, K is a spring constant of the spring, and X is a displacement of the spring.

20. The microelectromechanical modeling system of claim 14, wherein the electrode model comprises electrodes and further comprises the following equation:

$$F_e = \frac{\epsilon_o LH}{2D^2}(V_m - V_s)^2$$

where $F_e$ is an electrostatic force, $\epsilon_o$ is a permittivity of free space, L is a length of the electrodes, H is a height of the electrodes, D is a distance between the electrodes, $V_m$ is a main electrode voltage, and $V_s$ is a secondary electrode voltage.

* * * * *